(12) United States Patent
Emami et al.

(10) Patent No.: US 12,378,617 B2
(45) Date of Patent: Aug. 5, 2025

(54) DEVICE AND METHOD FOR CONTINUOUS DESULPHURISATION OF LIQUID HOT METAL

(71) Applicant: TATA STEEL NEDERLAND TECHNOLOGY B.V., Velsen-Noord (NL)

(72) Inventors: Ali Emami, Haarlem (NL); Frank Nicolaas Hermanus Schrama, Leiden (NL); Johan Willem Koenraad Van Boggelen, Alkmaar (NL)

(73) Assignee: TATA STEEL NEDERLAND TECHNOLOGY B.V., Velsen-Noord (NL)

( * ) Notice: Subject to any disclaimer, the term of this patent is extended or adjusted under 35 U.S.C. 154(b) by 888 days.

(21) Appl. No.: 17/600,599

(22) PCT Filed: May 19, 2020

(86) PCT No.: PCT/EP2020/064008
§ 371 (c)(1),
(2) Date: Sep. 30, 2021

(87) PCT Pub. No.: WO2020/239554
PCT Pub. Date: Dec. 3, 2020

(65) Prior Publication Data
US 2022/0170122 A1 Jun. 2, 2022

(30) Foreign Application Priority Data

May 24, 2019 (EP) ...................................... 19176486

(51) Int. Cl.
*C21C 1/02* (2006.01)
(52) U.S. Cl.
CPC .................................. *C21C 1/025* (2013.01)

(58) Field of Classification Search
CPC ..... C21C 1/025; C21C 7/0037; C21C 7/0068; C21C 7/064; C21C 1/02; Y02P 10/20
(Continued)

(56) References Cited

U.S. PATENT DOCUMENTS

| | | | | |
|---|---|---|---|---|
| 2,577,764 A | * | 12/1951 | Hulme | ...................... C21C 1/02 266/166 |
| 3,715,202 A | | 2/1973 | Kosmider et al. | |
| 4,808,219 A | * | 2/1989 | Metz | ........................ H05B 6/34 75/10.16 |

FOREIGN PATENT DOCUMENTS

| | | |
|---|---|---|
| DE | 4429653 A1 | 2/1996 |
| FR | 2013357 A1 | 4/1970 |

(Continued)

OTHER PUBLICATIONS

International Search Report and Written Opinion mailed Jun. 29, 2020 for PCT/EP2020/064008 to Tata Steel Nederland Technology B.V. filed May 19, 2020 Steelmaking, vol. 44-5,.

(Continued)

*Primary Examiner* — Danielle M. Carda
(74) *Attorney, Agent, or Firm* — Vorys, Sater, Seymour and Pease LLP; Anthony P. Venturino; Maryellen Feehery Hank

(57) ABSTRACT

A device and a method for continuous desulphurisation of liquid iron provided by a blast furnace process or a direct reduction process. The device including a desulphurisation reactor or a plurality of consecutive desulphurisation reactors. The desulphurisation reactor or reactors each include an entry section for receiving liquid iron from liquid iron production means or from the desulphurisation reactor immediately preceding the subsequent desulphurisation reactor, and a reaction section for removing the sulphur from the liquid iron.

21 Claims, 9 Drawing Sheets

(58) Field of Classification Search
USPC .......................................................... 75/570
See application file for complete search history.

(56) References Cited

FOREIGN PATENT DOCUMENTS

| | | | |
|---|---|---|---|
| GB | 1179926 | A | 2/1970 |
| JP | 658217618 | A | 12/1983 |
| JP | 86035408 | B2 | 8/1985 |
| JP | H05171239 | A | 7/1993 |

OTHER PUBLICATIONS

Schrama et al., "Sulphur removal in ironmaking and oxygen steelmaking", Ironmaking & Steelmaking, vol. 44-5, pp. 333-343 (2017).

* cited by examiner

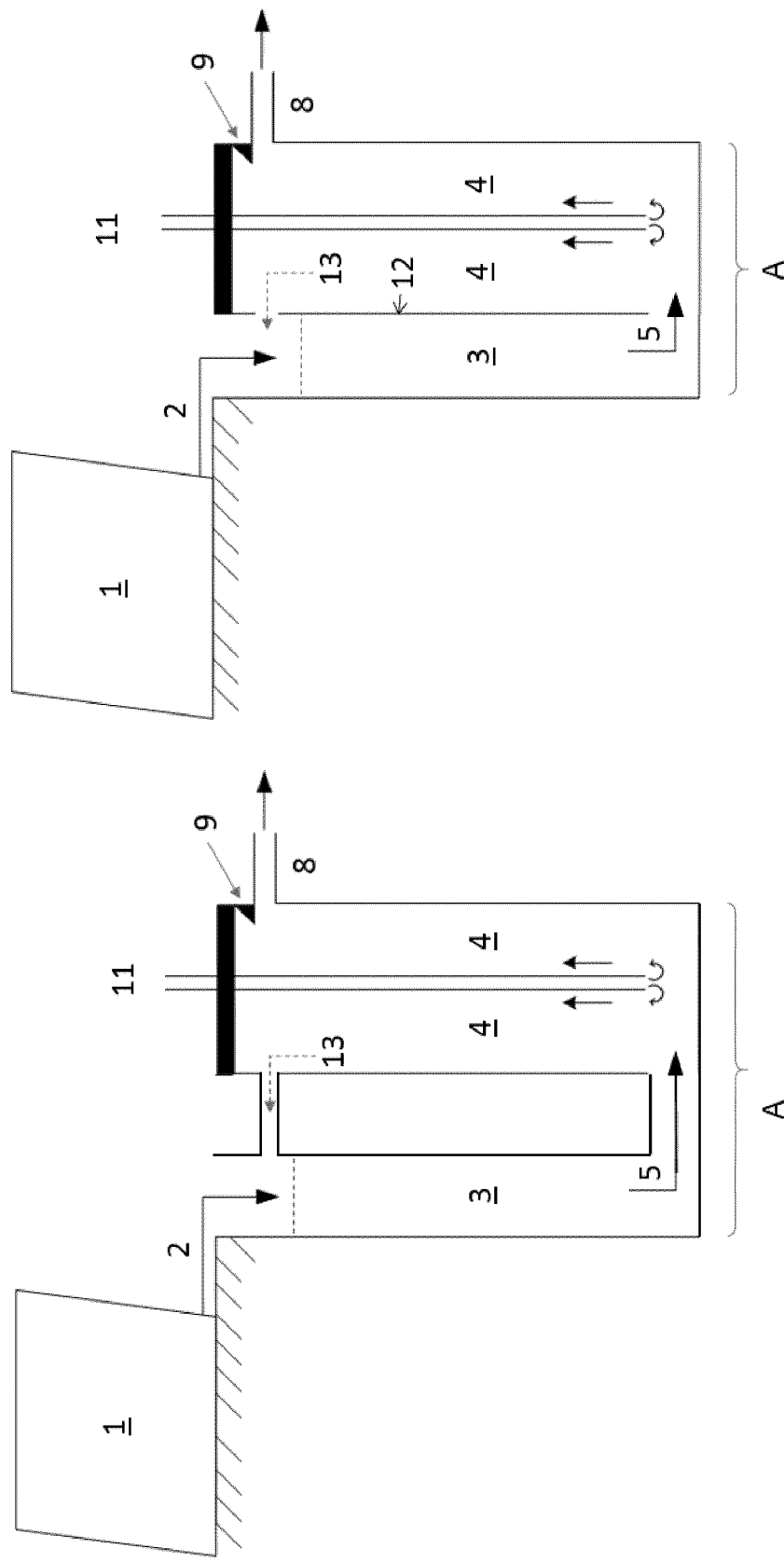

DEVICE AND METHOD FOR CONTINUOUS DESULPHURISATION OF LIQUID HOT METAL

CROSS-REFERENCE TO RELATED APPLICATIONS

This is a § 371 National Stage Application of International Application No. PCT/EP2020/064008 filed on May 19, 2020, claiming the priority of European Patent Application No. 19176486.9 filed on May 24, 2019.

FIELD OF THE INVENTION

This invention relates to a device and method for continuous desulphurisation of liquid hot metal.

BACKGROUND OF THE INVENTION

Today, roughly two-thirds of the world's steel is produced via the integrated blast furnace-basic oxygen furnace (BF-BOF) route. In this process, iron ore is reduced mainly by coke in the blast furnace (BF). This coke also produces the required heat by reacting with the available oxygen (from the hot blast and the FeO). The liquid iron (also referred to as pig iron) that leaves the BF contains impurities, which must be removed later in the process. In the liquid iron pre-treatment most of the sulphur (and sometimes silicon and phosphorus as well) is removed. The liquid is then charged to the basic oxygen furnace or converter, together with scrap, where it is oxidised by blowing pure oxygen on the melt, and most of the carbon, (remaining) silicon and phosphorus is removed. The produced liquid steel is tapped from the converter and sent to the secondary metallurgy (SM) ladle treatment before being cast. Here remaining impurities are removed, and alloying elements and deoxidisers are added. When the steel has the desired chemical composition, it is cast into solid steel. FIG. 1 gives a schematic overview of the BF-BOF steelmaking process. One of the above-mentioned unwanted impurities in the steelmaking process is sulphur. In many cases sulphur increases the brittleness of steel and decreases the weldability and corrosion resistance. Therefore, sulphur needs to be removed, to typically below 0.015 wt. %, but increasingly to levels below 0.005 wt. %. The main source of sulphur in the BF-BOF steelmaking process comes from coke.

Even though roughly 40% of the sulphur in coal is removed in the coking process, typical sulphur levels in coke remain around 0.5%. Iron ore contains typically 0.01% sulphur and is only a minor source of sulphur in the steelmaking process. In the BF-BOF steelmaking process there are four process steps where sulphur can be removed:
  BF process;
  liquid iron pre-treatment;
  converter process;
  SM ladle treatment.

In the other main steelmaking process, the electric arc furnace (EAF) process (used for 30% of the world's steel production), the scrap types used in the process are selected to control the sulphur concentration of the liquid steel. The SM ladle treatment processes are comparable for both BF-BOF and EAF steelmaking, and therefore, if necessary, sulphur removal could take place. However, sulphur removal is less of an issue in the EAF process, since its raw materials (scrap and/or direct reduced iron) contain less sulphur than the raw materials of the BF-BOF process (iron ore, coke and coal). In the BOF-process about 30% of the charge in the converter consists of scrap which contributes to the sulphur content of the liquid metal in the converter (Schrama et al., "Sulphur removal in ironmaking and oxygen steelmaking", Ironmaking & Steelmaking, Volume 44-5, pp. 333-343 (2017)).

An alternative ironmaking process is the HIsarna® ironmaking process. This is a direct reduced iron process for iron making in which iron ore is processed almost directly into hot metal (liquid iron). The process combines two process units, the Cyclone Converter Furnace (CCF) for ore melting and pre-reduction and a Smelting Reduction Vessel (SRV) where the final reduction stage to liquid iron takes place. The process does not require the manufacturing of iron ore agglomerates such as pellets and sinter, nor the production of coke, which are necessary for the blast furnace process. Without these steps, the HIsarna process is more energy-efficient and has a lower carbon footprint than traditional ironmaking processes. Since this process uses similar raw materials as the BF-BOF process (iron ore, coke and coal), the demand for sulphur removal from the hot metal would be expected to be similar. However, although input sulphur amounts are comparable in BF and HIsarna, the sulphur levels in HIsarna hot metal are typically higher than BF hot metal. This is due to a more reducing environment in the reaction chamber in the HIsarna process.

| Typical composition in wt % for HIsarna and BF hot metal | | | | |
|---|---|---|---|---|
| | HIsarna | | Blast Furnace | |
| | Min | Max | Min | Max |
| C | 3.5 | 4.6 | 4.4 | 4.7 |
| Si | 0.003 | 0.171 | 0.18 | 1.2 |
| S | 0.05 | 0.29 | 0.004 | 0.092 |
| P | 0.011 | 0.082 | 0.059 | 0.084 |
| Mn | 0.015 | 0.225 | 0.25 | 0.45 |

Desulphurisation of liquid iron can be achieved by adding reactive compounds to the liquid iron, such as lime, calcium carbide and magnesium. Lime can be used at any one of the four steelmaking process steps. Magnesium is usually not used in the SM-ladle treatment, but only for the liquid iron pre-treatment (Schrama et al., Steelmaking, Ironmaking & Steelmaking, Volume 44-5, pp. 333-343 (2017)).

The liquid iron from the BF or the HIsarna process typically contains as much as 0.03% of sulphur for the BF process and 0.05-0.015% for the HIsarna process. In case of using high sulphur coal, coke or iron ore, it can be even higher. For high quality steel grades steel a sulphur content below 0.005% is quite typical these days, and the trend is towards ever lower values.

Hot metal from the blast furnace is transported to the steel plant in so-called torpedo cars. In the steel plant the torpedo car is emptied into a ladle. Desulphurisation takes place in these ladles. Several designs are being used for this desulphurisation, such as the Kanbara Reactor (KR). After treatment of the liquid iron in this reactor the desulphurised liquid iron can be emptied into the converter of the BOF for further processing.

The nature of this process that is used throughout the steel industry is that each ladle may have a different sulphur content, temperature or overall composition due to the batch-wise process.

The transport of ladles filled with liquid iron through the works is also a source of potential safety hazards and loss of production, as each transport brings along a risk of spillage, risk to personnel and risk of process disturbances.

Objectives of the Invention

It is an object of the invention to provide a device and a method for continuous desulphurisation of liquid iron.

It is also an object of the invention to provide a device that enables desulphurised liquid iron to be produced with a constant sulphur content.

It is also an object of the invention to provide a device that enables desulphurised liquid iron to be produced at a lower risk of spillage, risk to personnel and risk of process disturbances.

It is also an object of the invention to provide a device that enables desulphurised liquid iron to be produced with fewer moving parts in the device.

DESCRIPTION OF THE INVENTION

As used herein, the meaning of "a", "an" or "the" includes singular and plural references unless the context clearly dictates otherwise.

As used herein, the term "liquid iron" intends to mean the liquid iron resulting from an ironmaking process in a blast furnace, electric arc furnace or from a direct ironmaking process.

As used herein, the term "desulphurised liquid iron" intends to mean liquid iron at various stages of desulphurisation between liquid iron (but not including liquid iron) and fully desulphurised liquid iron, i.e. the degree of desulphurisation>0% and up to and including 100%. It is noted that this fully desulphurised liquid iron is normally not achievable, although values of below 0.001 wt. % S in desulphurised liquid iron after starting from (typically) 0.03 wt. % S, which is a degree of desulphurisation of about 97%.

As used herein, the term "a plurality" means two (2) or more.

As used herein, the phrase "a device consisting of plurality of reactors (A, B,..)" intends to encompass a device consisting of two (A, B) or more reactors, e.g. three (A, B, C) or four (A, B, C, D), etc.

One or more of the objects are obtained by the device for desulphurisation of liquid iron comprising a desulphurisation reactor (A) or a plurality of consecutive desulphurisation reactors (A, B, ..), wherein the desulphurisation reactor or reactors each comprise an entry section (3) for receiving liquid iron (2) from liquid iron production means (1) or from the desulphurisation reactor (A) immediately preceding the subsequent desulphurisation reactor (B), and a reaction section (4) for removing the sulphur from the liquid iron, wherein the entry section (3) and the reaction section (4) in the desulphurisation reactors act as communicating vessels, wherein a passage (5) is provided between the entry section (3) and the reaction section (4) to allow, in use, the liquid iron to flow from the entry section (3) to the reaction section, wherein supply means for the liquid iron into the first or only desulphurisation reactor (A) are provided in the entry section, and wherein means (11) for introducing reagents into the liquid iron in the reaction section or in the entry section are provided and wherein the means (11) for introducing reagents into the liquid iron comprise a submerged lance, and wherein an outlet (8) is provided in the reaction section (4), preferably at or near the top of the reaction section (4), to allow desulphurised liquid iron to exit the reaction section (4), and wherein (i) a return passage (13) is provided between the reaction section (4) of a desulphurisation reactor (A) and the entry section (3) of said desulphurisation reactor (A), and/or (ii) wherein a return passage (13) is provided between the first and the second desulphurisation reactor (A, B, ..), wherein the return passage connects the entry section (3) of the second reactor (B) to the reaction section (4) of the first desulphurisation reactor (A), to increase, in use, the residence time of the liquid iron in the device.

Situation i is schematically depicted in FIGS. 4 and 5. FIG. 7 shows a plurality of reactors as in FIG. 5, and situation ii is schematically depicted in FIG. 8, and the combination of i and ii is the combination of FIGS. 7 and 8. The device according to the invention comprises at least two compartments, an entry section and a reaction section which are connected in such a way that they form communicating vessels. In use, liquid iron enters the device through an inlet in the entry section. The form of the inlet is not particularly restrictive. This inlet may be a simple opening in the upper side of the entry section where the liquid iron is simply poured into the entry section. Intermediate buffering means may be provided for liquid iron between the source of the liquid iron (e.g. BF, HIsarna, . . . ) and the desulphurisation reactor(s). With intermediate buffering means any irregularity in the flow of liquid iron from the source can be mitigated to ensure a controlled flow of liquid iron into the entry section. The inlet may also be an inlet port in the entry section at any height of the entry section. However, as all the liquid iron needs to be desulphurised, and the transport of the liquid iron through the device is based on the communicating-vessel-principle, entry of the liquid iron at or near the top of the entry section is preferable to prevent stagnation or cooling of the liquid iron in the entry section. The use of the communicating-vessel-principle for transporting the liquid iron through the device relies on the presence of communicating vessels and on the continuous inlet and outlet of liquid iron. The inlet of the liquid iron was described herein above. The outlet of the desulphurised liquid iron is located on top of the reaction section. By continuously allowing liquid iron to enter the entry section, the liquid iron is 'pushed' out at the outlet which is preferably provided at or near the top of the reaction section. The connection between the entry section and the reaction section is formed by a passage. The passage is preferably located at or near the bottom of the reaction section to provide as much time as possible for the desulphurisation of the liquid iron in the reaction vessel. Although it is not strictly necessary to locate the passage at or near the bottom of the entry section, it is deemed preferable to do so to prevent any risk of a stagnating pocket of liquid iron in the entry section below the passage. The passage may be a conduit. The conduit may be a tube or pipe, which may have a circular cross-section, but is not limited thereto.

It should be noted that where it is said that a return passage (13) is provided between the first and the second desulphurisation reactor (A, B, ..), this includes the embodiment where a return passage (13) is also provided between one or more pairs of subsequent reactors (e.g. between B and C), or where a return passage (13) is only provided between one of the subsequent reactors (e.g. between B and C) and not between the first and the second reactor (A and B), if so desired.

In the reaction vessel means comprising a submerged lance are provided for introducing reagents into the liquid iron. At least part of the reagents vaporise, dissociate or react to form vapour bubbles or gas bubbles after introduction into the liquid iron, wherein the bubbles reduce the specific weight of the liquid iron in the reaction section, while simultaneously desulphurising the liquid iron by reacting with the sulphur in the liquid iron, and wherein, because of the difference in specific weight of the liquid iron entering the entry section and the specific weight of the liquid iron in the reaction section, the liquid iron causes an additional contribution to the overall flow of the liquid iron from the entry section to the reaction section and subsequently to and through the outlet of the reaction section. This phenomenon is called "Airlift". It is noted that the communicating-vessel-principle already ensures a flow from the entry in the entry section to the outlet of the reaction section. The presence of gas bubbles in the liquid iron of the reaction centres intensifies this flow because the liquid iron with gas bubbles has a lower specific density than the liquid iron entering the device in the entry section.

The means for introducing the reagents into the liquid iron in the reaction section are not particularly restrictive if they are able to introduce the reagents sufficiently deep in the reaction vessel. The deeper, the longer the reagents can react with the sulphur in the liquid iron, and the more effective the desulphurisation will be. Also, because of the intensification of the flow of liquid iron by the presence of bubbles, it is beneficial to introduce the reagents as deep as possible in the reaction section. By optimising the combined effect on the flow of the liquid iron through the device of the introduction of the reagents and the flow provided by the communicating-vessel-principle there is no need for stirring of the liquid iron in the reaction section.

The flow of the liquid iron through the desulphurisation reactor is the result of the difference in the specific weights in the communicating vessels (entry section(s) and reaction section(s)) in combination with the flow rate of liquid iron entering the entry section from the liquid iron production means. Therefore, the height of the reactor itself is not particularly relevant. The height of the reactor is not instrumental in moving the liquid iron. The height of the reactor is instrumental in determining the residence time, together with the flow rate of the liquid iron entering the reactor.

The device according to the invention increases the residence time of the liquid iron in the device by means of the return passage. This not only results in a more effective desulphurisation, it also reduces the heat loss of the reactor by lowering the average temperature of the liquid iron in the reactor. The increase in residence time allows a deeper desulphurisation and the lowering of average temperature reduces the energy loss. The desulphurisation is further improved by using a plurality of reactors A, B, etc, because each subsequent reactor receives liquid iron which is already partly desulphurised. By the recirculation the size of the reactor needed to attain a certain level of desulphurisation can be significantly reduced.

The initial decrease of sulphur in a desulphurisation reaction is very fast. As the sulphur content decreases, it becomes much harder hard to further remove sulphur. A large volume reactor with a well-mixed content will therefore be less efficient to remove sulphur than a smaller reactor with either recirculation, or a series of smaller reactors, or a combination of recirculation and a series of reactors. A reactor with three 15 m$^3$ rectors without recirculation already leads to a sulphur content in the desulphurised liquid iron similar to what one 100 m$^3$ single reactor can achieve, even without recirculation. Adding recirculation will bring down the volume of the reactor according to the invention even further.

In an embodiment slag removal (9) means are provided for separating the slag that, in use, is floating on top of the liquid iron, from the liquid desulphurised iron.

Preferably at or near the top of the reaction section, between the outlet 8 and the reaction section 4, means are provided for separating the desulphurised liquid iron exiting the reaction section from the slag that, in use, is floating on top of the liquid iron in the reaction section. The slag can be separated from the desulphurised iron on which it floats by means of skimmers that extend into the liquid iron and allow only liquid iron to pass underneath it, or by means of a so-called foxhole which is provided with an inlet under the level of the slag, so that only liquid iron can pass, or by means of skimming by using a rake that rakes off the slag. The way the slag is separated from the liquid iron is not particularly restrictive, but it is strongly preferred that the separation process can be executed in a continuous mode. The separated slag can be led away to a slag processing plant, and the liquid iron can be led away for further processing.

It is noted that the reaction section may be closed, e.g. by means of a lid, to prevent heat loss from the device, or to prevent reaction of the slag with the surrounding atmosphere, or to prevent dust formation or the like. However, the reaction section may be open to the surrounding atmosphere if that is preferable.

It is beneficial if the time for the bubble to interact with the liquid iron is as long as possible during the ascent of the bubbles through the liquid iron. The reactor length to diameter ratio, i.e. aspect ratio, for a bubble column reactor is important because the residence time of the injected gas is strongly dependent on this parameter and also it is an important parameter in hydrodynamics of the reactor. It is therefore preferable that the reaction section is high in relation to its cross-section (i.e. has a high aspect ratio). A long and narrow reaction section (high aspect ratio) is preferable over a shallow and wide reaction section (low aspect ratio). In an embodiment of the invention the aspect ratio (height of the reaction section/the largest diameter or diagonal of the cross-section of the respective reaction section) is at least 3. Preferably the aspect ratio of the reaction section is at least 4 or 5 or 6 or 7 or 8 or 9 or 10 or more times larger than the largest diameter or diagonal of the cross-section of the respective reaction section. It was found that a higher aspect ratio favours the desulphurisation reactor's performance. Increasing the aspect ratio decreases the final S content and also increases the final Mg's yield. A typical aspect ratio for a ladle in a batch desulphurization process is about 2.

The residence time of the reagents is dependent on the height of the reactor and higher reactors would favour better reagent utilization. In reactors such as the KR-reactor, the mechanical stirring of the liquid iron ensures that the reagents are brought to the reaction sites thereby speeding up the desulphurisation reaction.

In this invention the desulphurisation is promoted by increasing the contact time, which is achieved by allowing the liquid iron to ascend together with the reagents. It is therefore preferable to increase the height of the reaction section in comparison to the cross-section of the reaction section (i.e. with an increased aspect ratio). As a measure for the cross-section the largest diameter or diagonal (depending on the shape of the cross-section) is defined. The higher the ratio of height/maximum dimension of cross section, the more intense the contact with the reagents and the longer the contact time, for a given throughput of liquid iron through the reaction section. The height is restricted by practical considerations, such as access for maintenance, but also by the reaction with the reagents which, at some stage, is completed. As soon as the reaction is completed the liquid iron should be led away.

In an embodiment of the invention a plurality of desulphurisation reactors (A, B, ..) is provided, and wherein the outlet (8) of a first desulphurisation reactor is connected to the inlet of a second desulphurisation reactor to allow the already desulphurised liquid iron to pass from the reaction section (4) of the first desulphurisation reactor (A) to the entry section of the second desulphurisation reactor (B).

In this embodiment the first reactor provides a first desulphurisation, and the resulting liquid iron from the first reactor is led from the reaction section of the first reactor for further processing into the inlet of the entry section of the second reactor. This process can be continued in further subsequent reactor vessels at will, so that the device can consist of one or more reactors, each comprising an entry section and a reaction section. The device according to the invention may therefore consist of one desulphurisation reactor, or of two desulphurisation reactors A and B, but it may also consist of more than two desulphurisation reactors (A, B, C, ..). In the latter case each subsequent desulphurisation reactor (e.g. C) is considered a second desulphurisation reactor and the desulphurisation reactor (B) immediately preceding this subsequent reactor C is a first reactor in the context of this invention. So in a device consisting of A, B and C reactors, reactor B is the second reactor in relation to the first reactor A, and reactor C is the second reactor in relation to the first reactor B. In principle, liquid iron could be led from the entry section of reactor C to the reaction section of reactor A through a return passage between C and A.

In an embodiment of the invention the means for introducing the reagents into the reaction section may be a lance that is coated with or consists of a refractory material capable of withstanding the liquid iron environment. Preferably the lance is a steel lance coated with refractory material. The lance may be provided with an evaporation chamber to allow the Mg to evaporate in a controlled way and thereby enhance the flow of liquid iron in the reactor with a reduced turbulence. The means for introducing the reagents may also comprise bottom plugs or tuyeres in the reaction section, although these are prone to blockage and therefore not preferred for the introduction of solid reagents into the liquid iron. Bottom plugs or tuyeres can effectively be used in addition to the lance to introduce a gaseous reagent or an inert gas into the reactor. Also, a combination of a lance and bottom plugs could be envisaged, e.g. for a stepped desulphurisation in one reaction section. The bubbling of inert gases from bottom plugs or tuyeres may promote the reduction of the specific weight of the liquid iron and thereby maintain the flow. The bubbles may also assist in the flotation of inclusions to the slag.

A submerged lance has many advantages over alternative means for introducing reagents into the liquid iron. The risks of blockage is substantially higher for the alternative means. And should a submerged lance despite this nevertheless become blocked or partially obstructed, the replacement and maintenance of a submerged lance is much easier than the replacement and maintenance of tuyeres or bottom plugs. Also, a submerged lance can be positioned such that the depth of injection of the reagents in the liquid iron can be varied, which is obviously not possible with fixed means. Said fixed means may be very useful in addition to the lance, e.g. for bubbling inert gases from below. It should be noted that the lance must be submerged, because the reagents that ensure the desulphurisation, such as Mg, are volatile and will be in gas form at the process temperature. A lance above the liquid will not result in an effective introduction of the reagents into the liquid iron. The device according to the invention relies on desulphurisation with Mg, which dissolves first in the liquid iron for homogenic desulphurisation, whereas prior art devices rely on CaO, $CaC_2$ or $Na_2CO_3$ (or another compound that stays solid/liquid and can only desulphurise heterogenically) resulting in very different thermodynamic and kinetic circumstances inside the reactors. So the device in accordance with the invention is characterised by the presence of a submerged lance to introduce the reagents to desulphurise the liquid iron in the reactor, a recirculation of part of the desulphurised iron to increase the residence time of the liquid iron in the reactor or reactors and, in an embodiment of the invention, by a plurality of subsequent desulphurisation reactors to further desulphurise the liquid iron. Both the increase in residence time and the use of a plurality of desulphurisation reactors allow for a decrease in reactor volume.

It should also be noted that the use of a recirculation of the liquid iron to increase the residence time precludes the combination of a subsequent desulphurisation, desiliconisation and dephosphorisation in a reactor comprising a plurality of reactors with recirculation, as disclosed in JPH05-171239, because these three processes are mutually incompatible. For de-S the oxygen activity should be low (which is the case for hot metal from the Blast Furnace or HIsarna). For de-Si and de-P the oxygen activity should be high, as these elements must be oxidised. This means that any return stream from the de-Si vessel to the de-S vessel is unwanted.

In an embodiment of the invention the entry section (3) and the reaction section (4) are separated from each other by a separation wall (12), wherein the passage (5) consists of an opening in the separation wall.

In this embodiment the entry section and the reaction section are constructively combined. The passage between the two section is therefore not an elongated conduit, but is formed by an opening in the separating wall between the two sections. This embodiment has the advantage that the reactor can be built more compactly, and that the heat regulation is controlled better. Also heat loss to the environment is limited, as the amount of external surface decreases.

In an embodiment a return passage (13) is provided between the reaction section and the entry section where liquid iron can flow back from the top of the reaction section into the entry section. This way this recirculated iron is subjected to an additional desulphurisation in the reaction section. The return passage can consist of a simple opening, but the controllability of the process can be greatly increased by providing opening-and-closing means such as a valve to regulate the amount of recirculation or to close the return passage completely. By controlling the amount of recirculation, the desulphurisation can be optimised, for instance if the liquid iron from the source (1) has an increased sulphur content due to a difference in sulphur content in the raw materials. The fraction of recirculated iron may vary depending on the difference between the desired degree and the actual degree of desulphurisation of the liquid iron. The location of the passage 13 is preferably at the same height as the output of the reaction section, so that a natural division may occur between part of the liquid iron leaving the reaction section through the outlet (8) and part of the liquid iron leaving the reaction section to the passage 13 into the entry section.

Alternatively, or additionally, the desulphurisation can also be controlled by changing the amount of reagent added to the liquid iron.

In an embodiment the reactor according to the invention is provided in the form of a unit that can be moved. It would be an option to hoist such a unit in and out of a dedicated location. The input could have the size and shape of a conventional ladle in a steel works which are able to hold up to several hundreds of tonnes of liquid iron. This location could be partly or completely below ground level, and the movable unit could have the form of a ladle with two sections, the entry section and the reaction section. This way it is easy to make use of the gravity effect. When located partly or completely below ground the insulation against heat loss is also enhanced. The movable unit could be removed for maintenance and a spare unit could be hoisted in place and connected to the inlet and outlet means. Means for emptying the movable unit before hoisting out the unit could be added to facilitate its removal, but the unit could also be lifted out with its contents, similar to a ladle in a conventional steelworks. The size of a reactor according to the invention may very well be of a similar size as the ladle in a conventional steelworks. If the unit is located above ground, then the unit could be emptied by providing a valve in or near the bottom of the unit.

The movable unit could have the form of a ladle with a plurality of entry sections or a plurality of reaction sections, or a plurality of entry sections and reaction sections.

The device according to the invention may comprise a plurality (A, B, . . . ) of desulphurisation reactors in series, each reactor comprising an entry section for receiving liquid iron, and each reactor comprising a reaction section for performing the desulphurisation of the liquid iron. In such a configuration the first reactor A receives the liquid iron from a liquid iron source in its entry section, desulphurises it in its reaction section and passes the desulphurised liquid iron to the entry section of reactor B, desulphurises it in its reaction section and passes the desulphurised liquid iron to the outlet of the device if it consists of two reactors (A, B) or to the entry section of reactor C (and so on) if the reactor consists of three (A, B, C) or more (A, B, C, ..) reactors.

In an embodiment of the invention a return passage (13) is provided between the first and the second desulphurization reactor (A, B,...), wherein the return passage connects the entry section (3) of the second reactor (B) to the reaction section (4) of the first desulphurisation reactor (A) (recirculation from reactor B to reactor A). This embodiment allows part of the desulphurised iron that enters the subsequent entry section to flow back to the reaction section of the preceding reactor. This way this recirculated iron is subjected to an additional desulphurisation in the preceding reactor. By controlling the amount of recirculation, the desulphurisation can be optimised, for instance if the liquid iron from the source (1) has an increased sulphur content due to a difference in sulphur content in the raw materials. The fraction of recirculated iron may vary depending on the difference between the desired degree and the actual degree of desulphurisation of the liquid iron. Alternatively, or additionally, the desulphurisation can also be controlled by changing the amount of reagent added to the liquid iron. The return passage is preferably located in the at or near the bottom of the reaction section to provide as much time as possible for the desulphurisation of the liquid iron in the reaction section.

In an embodiment of the invention the return passage or passages (13) is or are provided with opening-and-closing means (14) for adjusting, in use, the return flow of desulphurised liquid iron from the entry section (3) of the second desulphurisation reactor to the reaction section (4) of the first desulphurisation reactor. The return passage can consist of a simple opening, but the controllability of the process can be greatly increased by providing opening-and-closing means such as a valve to regulate the amount of recirculation or to close the return passage completely.

In an embodiment of the invention a return passage (13) is provided between the reaction section (4) of desulphurisation reactor (A) and the entry section (3) of desulphurisation reactor (A), preferably wherein the return passage (13) is provided with opening-and-closing means (14) for adjusting, in use, the return flow of desulphurised liquid iron from the entry section (3) of the second desulphurisation reactor to the reaction section (4) of the first desulphurisation reactor. This is applicable to the single reactor device as schematically depicted in FIGS. 4 and 5 (recirculation within single reactor A), or to the multi-reactor device as depicted schematically in FIG. 8 (recirculation within any one or all of reactors A, B and C).

In an embodiment of the invention a return passage (13) is provided between the reaction section and the entry section of a one or more reactors (A, B, ..), wherein the return passage connects the entry section (3) of reactor A to the reaction section (4) of reactor (A). This embodiment allows part of the desulphurised iron that is about to exit the reactor A to the next reactor to re-enter the entry section to flow back to the reaction section of the reactor (recirculation within reactor A). This way this recirculated iron is subjected to an additional desulphurisation in the reactor. By controlling the amount of recirculation, the desulphurisation can be optimised, for instance if the liquid iron from the source (1) has an increased sulphur content due to a difference in sulphur content in the raw materials. The fraction of recirculated iron may vary depending on the difference between the desired degree and the actual degree of desulphurisation of the liquid iron. Alternatively, or additionally, the desulphurisation can also be controlled by changing the amount of reagent added to the liquid iron. By providing opening-and-closing means in the return passage, such as a valve to regulate the amount of recirculation or to close the return passage completely, the amount of recirculated liquid iron can be controlled. The location of the passage 13 is preferably at the same height as the output of the reaction section, so that a natural division may occur between part of the liquid iron leaving the reaction section through the outlet (8) and part of the liquid iron leaving the reaction section to the passage 13 into the entry section.

In an embodiment the device is provided with return passage(s) (13) in the wall separating the entry section from the reaction section in one or more of the reactors in a device comprising a plurality of reactors (A, B, . . . ) and with return passage(s) (13) in the wall separating the entry section of the second reactor (B) from the reaction section in the first reactor (A), optionally wherein one, more or all of the return passages are provided with opening-and-closing means. This applies mutatis mutandis for a device comprising three or more reactors.

In an embodiment of the invention the entry section (3) of the second desulphurisation reactor (B) and the reaction section (3) of the first desulphurisation reactor (A) are separated by a separation wall (15), wherein the return passage (13) consists of an opening in the separation wall (15). This device is more compact by not only providing a single separating wall between the entry and reaction section of a reactor, but also by providing a single separating wall between the reaction section of a reactor and the entry section of the subsequent reactor. This is beneficial to prevent heat losses.

In an embodiment the liquid iron production means (1) comprise a direct reduction ironmaking process, preferably the HIsarna® ironmaking process. This process is a highly flexible process which can produce liquid iron from a variety of raw materials which could result in a more fluctuating sulphur level than in case of BF-iron. BF-processes benefit from a constant composition of raw material, and therefore the liquid iron BF-output has a more constant, and usually somewhat lower, sulphur content. The flexibility of the device according to the invention is well suited to complement the HIsarna-process or other direct reduction ironmaking processes.

The device according to the invention may be provided with a slag flotation section is behind the reactor or, in case of a multi-reactor device, behind one or more reactors, every reactor or only the last reactor to allow, in use, the slag and any inclusions in the slag to float to the surface of the liquid iron and to allow removal of the slag from the liquid iron.

According to the second aspect, the invention is also embodied in a method for desulphurisation of liquid iron in a device comprising one desulphurisation reactor or a plurality of consecutive desulphurisation reactors (A, B, ..), wherein liquid iron (2) produced by liquid iron production means (1) enters the entry section (3) of a desulphurisation reactor (A) and subsequently flows to the reaction section (4) of the desulphurisation reactor (A) through the passage (5) between the entry section (3) and the reaction section (4), wherein the entry section (3) and the reaction section (4) act as communicating vessels, and wherein reagents are introduced into the liquid iron in the reaction vessel by means for introducing reagents into the liquid iron (11) wherein the means (11) for introducing reagents into the liquid iron comprise a submerged lance, wherein at least part of the reagents vaporise, dissociate or react to form bubbles after introduction into the liquid iron, wherein the bubbles reduce the specific weight of the liquid iron in the reaction section (4), while simultaneously desulphurising the liquid iron by reacting with the sulphur in the liquid iron, and wherein, because of the difference in specific weight of the liquid iron entering the entry section (3) and the specific weight of the liquid iron in the reaction section (4), the liquid iron causes an overall flow of the liquid iron from the entry section (3) to the reaction section (4) and subsequently to and through the outlet (8) of the reaction section (4), and wherein (i) a return passage (13) is provided between the reaction section (4) of desulphurisation reactor (A) and the entry section (3) of desulphurisation reactor (A), and/or (ii) wherein a return passage (13) is provided between the first and the second desulphurisation reactor (A, B, ..), wherein the return passage connects the entry section (3) of the second reactor (B) to the reaction section (4) of the first desulphurisation reactor (A) to increase the residence time of the liquid iron in the device.

The method according to the invention is based on the use of a device according to the invention. Liquid iron enters the device through an inlet in the entry section. The liquid iron is transported to the reaction section using the communicating-vessel-principle in combination with the airlift-phenomenon. By continuously allowing liquid iron to enter the entry section, the liquid iron is 'pushed' out at the outlet which is preferably provided at or near the top of the reaction section. The level of the outlet is tailored to the level of the iron at the entry section. Reagents are introduced into the liquid iron in the reaction section. At least part of the reagents vaporise, dissociate or react to form bubbles after introduction into the liquid iron, wherein the bubbles reduce the specific weight of the liquid iron in the reaction section, while simultaneously desulphurising the liquid iron by reacting with the sulphur in the liquid iron, and wherein, because of the difference in specific weight of the liquid iron entering the entry section and the specific weight of the liquid iron in the reaction section, the liquid iron causes an additional contribution to the overall flow of the liquid iron from the entry section to the reaction section and subsequently to and through the outlet of the reaction section. It is noted that the communicating-vessel-principle already ensures a flow from the entry in the entry section to the outlet of the reaction section. The presence of gas bubbles in the liquid iron of the reaction centres intensifies this flow because the liquid iron with gas bubbles has a lower specific density than the liquid iron entering the device in the entry section.

It is also noted that the slag that floats on top of the liquid iron in the reaction section must be taken into account in the positioning of the level of the output. By using slag separation means the slag is prevented to leave the reaction section together with the desulphurised iron. Excess slag can be separated from the desulphurised iron on which it floats by means of skimmers that extend into the liquid iron and allow only liquid iron to pass underneath it, or by means of a so-called foxhole which is provided with an inlet under the level of the slag, so that only liquid iron can pass. The way the slag is separated from the liquid iron is not particularly restrictive, but it is strongly preferred that the separation process can be executed in a continuous mode. The separated slag can be led away to a slag processing plant, and the liquid iron can be led away for further processing.

It is important to note that liquid iron that is produced in a blast furnace process usually comes with a liquid slag floating on top of it. Liquid iron that is produced in a direct reduction process, such as the HIsarna process, usually comes without any slag. If in the latter case the liquid iron is desulphurised according to the invention, then the reagents introduced into the liquid iron, such as Mg and lime, result in a solid slag, which is undesirable. This would also be the case if the slag floating on the liquid iron resulting from the blast furnace is completely removed after the first reactor in a sequence of desulphurisation reactors (A, B, ..). Also in that case reagents introduced into the liquid iron, such as Mg and lime, result in a solid slag, which is undesirable. So in both these cases where there is no liquid slag on top of the liquid iron slag-forming compounds such as $SiO_2$, $Al_2O_3$, $N_2O$, $K_2O$, $CaF_2$, $KAlF_4$, $Na_3AlF_6$ or $CaCl_2$), $MnO$ or $TiO_2$ are added to the liquid iron together with the reagents or added separately, to produce a liquid slag that floats on the liquid iron. The use of at least the slag-forming compounds $SiO_2$, $Al_2O_3$ is preferred.

The means for introducing the reagents into the liquid iron in the reaction section are not particularly restrictive if they are able to introduce the reagents sufficiently deep in the reaction vessel. The deeper, the longer the reagents can react with the sulphur in the liquid iron, and the more effective the desulphurisation will be. Also, because of the intensification of the flow of liquid iron by the presence of bubbles, it is beneficial to introduce the reagents as deep as possible in the reaction section. By optimising the combined effect on the flow of the liquid iron through the device of the introduction of the reagents and the flow provided by the communicating-vessel-principle there is no need for stirring of the liquid iron in the reaction section.

In a preferable embodiment the reagents are below 0.33 times the liquid iron ($h_{iron}$). The principle of the method according to the invention relies on the use of a difference in specific weight of liquid iron without bubbles and the specific weight of liquid iron with bubbles. The deeper the gas bubbles form, the larger effect this difference has on the flow of the liquid iron, because the iron in the entry section is 'heavier' than the iron in the reaction section because of the difference in specific weight. For this reason, it is important that at least part of the reagents that are used to desulphurise the liquid iron vaporise, dissociate or react to form bubbles after introduction into the liquid iron, wherein the bubbles reduce the specific weight of the liquid iron in the reaction section. Well-known reagents used in desulphurising liquid iron are Mg, lime, calcium carbide, $CaF_2$, soda ash ($Na_2CO_3$). The reagents, when added by means of a submerged lance, are transported through the lance and into the liquid iron by means of a carrier gas. Typically this carrier gas is nitrogen ($N_2(g)$) or, alternatively, argon ($Ar(g)$) or helium ($He(g)$). These gases also assist in the reduction of the specific weight in addition to the effect of the reagents. It is also possible to add components to the liquid iron which do not specifically contribute directly in the desulphurisation process, but which have the function of forming gas bubbles in the iron to promote the reduction of the specific weight, and thereby maintain the flow. This could also be promoted by bubbling inert gases from below.

The effect of the reagents that vaporise, dissociate or react to form vapour bubbles or gas bubbles forming is strongest if it occurs deep in the reaction section. The injection depth is therefore preferably below 0.50 of the liquid iron level ($h_{iron}$) in the reaction section. More preferably the depth is below 0.33, even more preferably below 0.25 or 0.10 times the liquid iron level. Preferably, when using a lance to introduce the reagents, the injection depth is not lower than 0.05 times the liquid iron level because in that case the distance between the injection depth and the bottom of the reaction section becomes too small. More preferably the injection depth is not lower than 0.08 times the liquid iron level. In case of bottom plugs to inject the reagents, the injection depth is at the bottom (i.e. at 0 times the liquid iron level).

To improve the effect of the injection of vaporising reagents by means of a lance an evaporation chamber may be used, and/or the lance may be equipped with means to achieve a lateral spread of the reagents in the liquid iron. An evaporation chamber may have a trumpet bell like shape.

In order to increase wherein the return passage (13) is provided with opening-and-closing means (14) to enable adjusting the return flow.

Optionally a return passage is provided between each entry section (3) of the second desulphurisation reactor and the reaction section (4) of the first desulphurisation reactor. In this embodiment a return passage is present between all subsequent reactors, allowing maximum flexibility and control, particularly if one, more or all of these return passages are provided with opening-and-closing means (14).

By effectively controlling the return flow, e.g. by suitable opening-and-closing means, such as a valve, and by monitoring the desulphurisation continuously, or by means of spot checks, the efficiency and effectivity of the desulphurisation process can be improved.

In a preferable embodiment a process is provided wherein liquid iron is continuously provided to the device, and wherein the liquid iron is continuously desulphurised in the device, and wherein desulphurised liquid iron continuously exits the device. Commonly known desulphurisation processes are based on batch-wise desulphurisation processing of liquid iron. The process and the device according to the invention allow for a continuous process.

In a preferred embodiment the liquid iron production means comprise a direct reduction ironmaking process, preferably the HIsarna® ironmaking process, and preferably the desulphurisation is conducted in a continuous process using the device and process according to the invention.

The desulphurised liquid iron resulting from the process according to the invention can be further processed in a refining process such as a BO-steelmaking process by charging the iron in a conventional converter, which is in essence a discontinuous and batch wise process.

However, the device and the process according to the invention can also be combined with further continuous liquid iron treatments such as continuous de-phosphorising and continuous decarburation, e.g. by combining the process according to the invention with a continuous converter process in which the desulphurised liquid iron resulting from the process according to the invention is further processed into steel in a continuous converter similar to the BO-steelmaking process, but in a continuous converter.

EXAMPLES

Based on a flow phenomenological model computer simulations were performed to perform a sensitivity analysis on variables like the number of reactors, the sequence of reactors, the use of return passages, the size of the reactors and the composition and temperature of the incoming and outgoing iron to arrive at an optimal combination.

For a desulphurisation unit able to process one million tonne/year of liquid iron with an average entry temperature of 1380° C. and entry sulphur content of between 800 and 1200 ppm (average 1000 ppm) to a final sulphur content of below 50 ppm a reactor volume for a reactor according to the invention of about 100 m³ is required. It also appeared that an aspect ratio of about 8 would be needed to achieve this. FIG. 13 shows the steady state sulphur content vs the reactor aspect ratio for these entry conditions.

By combining a plurality of reactors the individual reactors can be downsized considerably. By combining three 15 m³ desulphurisation reactors and operating them in series (as schematically depicted in FIG. 6) the following results are obtained:

| Degree of desulphurization in each reactor in the sequence | | |
| --- | --- | --- |
| Reactor in the sequence | Inlet S concentration (ppm) | Outlet S concentration (ppm) |
| Reactor 1 | 1000 | 127 |
| Reactor 2 | 127 | 48 |
| Reactor 3 | 48 | 27 |

With a smaller reactor, the final sulphur content is already below the value of the large reactor after 2 reactors (48 ppm) and 27 ppm after 3 reactors. The main desulphurisation is achieved in the first reactor due to the exponential dependency of the apparent reaction rate on the outlet S content in the reactor. The device is therefore able to cope with fluctuations in the inlet S concentration with relative ease. Because of such strong dependency on the S content in the reactor, the initial part of the desulphurization occurs with a much higher rate than the subsequent parts. It is noted that with these relatively small sequential reactors the size of the reactor is such that the preferred high aspect ratio is easy to accomplish technically. Also, with 15 m³, the volume of these reactors is considerably smaller than an industrial ladle which is about 50 m³, and a sequence of three is of the same order as an industrial ladle.

BRIEF DESCRIPTION OF THE DRAWINGS

The invention will now be explained by means of the following, non-limiting figures.

FIG. 4—as FIG. 2 with return passage 13.

FIG. 5—as FIG. 3 with return passage 13.

DETAILED DESCRIPTION OF THE DRAWINGS

Figure 1:
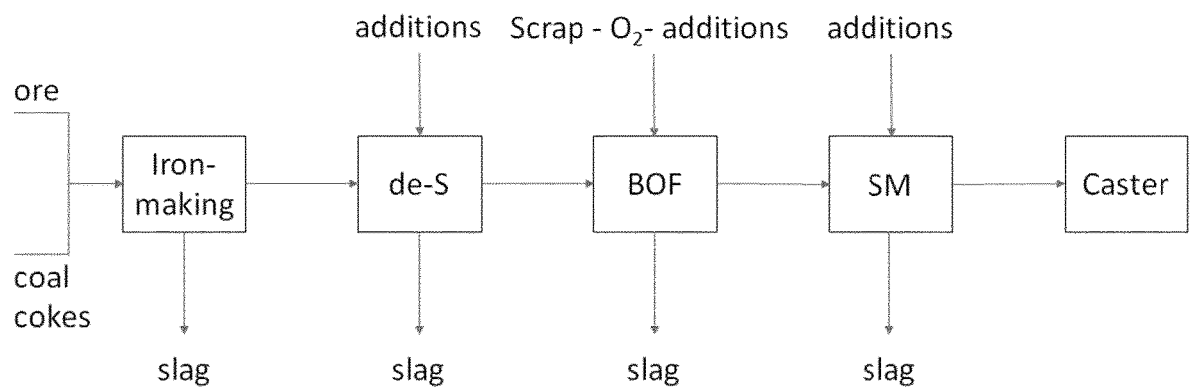
FIG. 1—schematic representation of the steelmaking process.

In FIG. 1 a simple schematic diagram of the steelmaking process is shown. Ore and coal and cokes are the main raw materials which are used to produce iron in an ironmaking process such as a blast furnace process or a direct-reduction ironmaking process. The liquid iron which is the product of this process needs to be desulphurised to remove the excess sulphur in the iron. After desulphurisation the iron is further refined (de-phosphorised, de carburised, etc.) in the steelmaking process, usually in a basic oxygen furnace (BOF). The resulting steel is further cleaned and compositionally fine-tuned in the secondary steelmaking (SM) and subsequently cast into slabs or strips.

Figure 2:
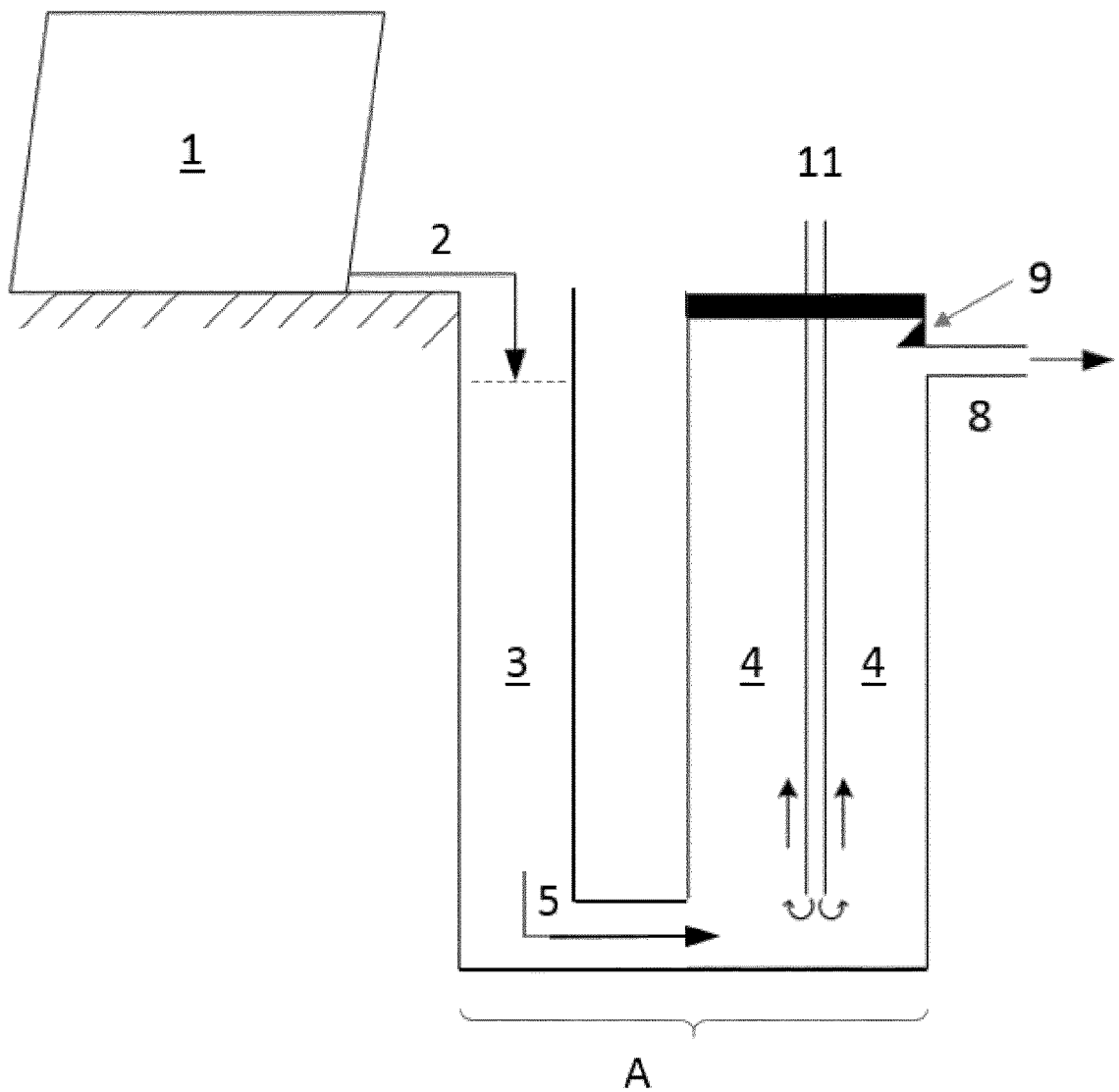
FIG. 2—schematic representation of an embodiment of the device according to the invention consisting of one desulphurisation reactor.

FIG. 2 shows an embodiment of the device according to the invention consisting of one desulphurisation reactor A. The liquid iron production means 1 provide liquid iron to the device through inlet 2 into the entry section 3 of the reactor. The entry section and the reaction section 4 are communicating vessels due to the presence of passage or conduit 5 and the liquid iron is pushed through the device as a result. Slag, floating on the liquid iron in the reaction section is skimmed off (e.g. see FIG. 9) and separated from the liquid iron that exits the reaction section through outlet 8. Reagents are introduced in the liquid iron in the reaction section by a submerged lance 11 (and/or through bottom plugs or the like (not shown) and these reagents are chosen such that they form bubbles in the liquid iron and act as desulphurising compounds. The bubbles ensure that the specific weight of the iron decreases, which aids the flow of iron from the entry section to the reaction section because the specific weight of the iron in the entry section is higher than the iron+bubbles in the reaction section. The sulphur is moved from dissolved sulphur in the liquid iron to the slag in the form of (e.g.) CaS or MgS, after which the slag layer is separated from the metal (see Schrama et al.). The liquid iron production means is not particularly restrictive and may be a conventional blast furnace, a scrap melting facility or a direct reduced iron making facility.

Figure 3:
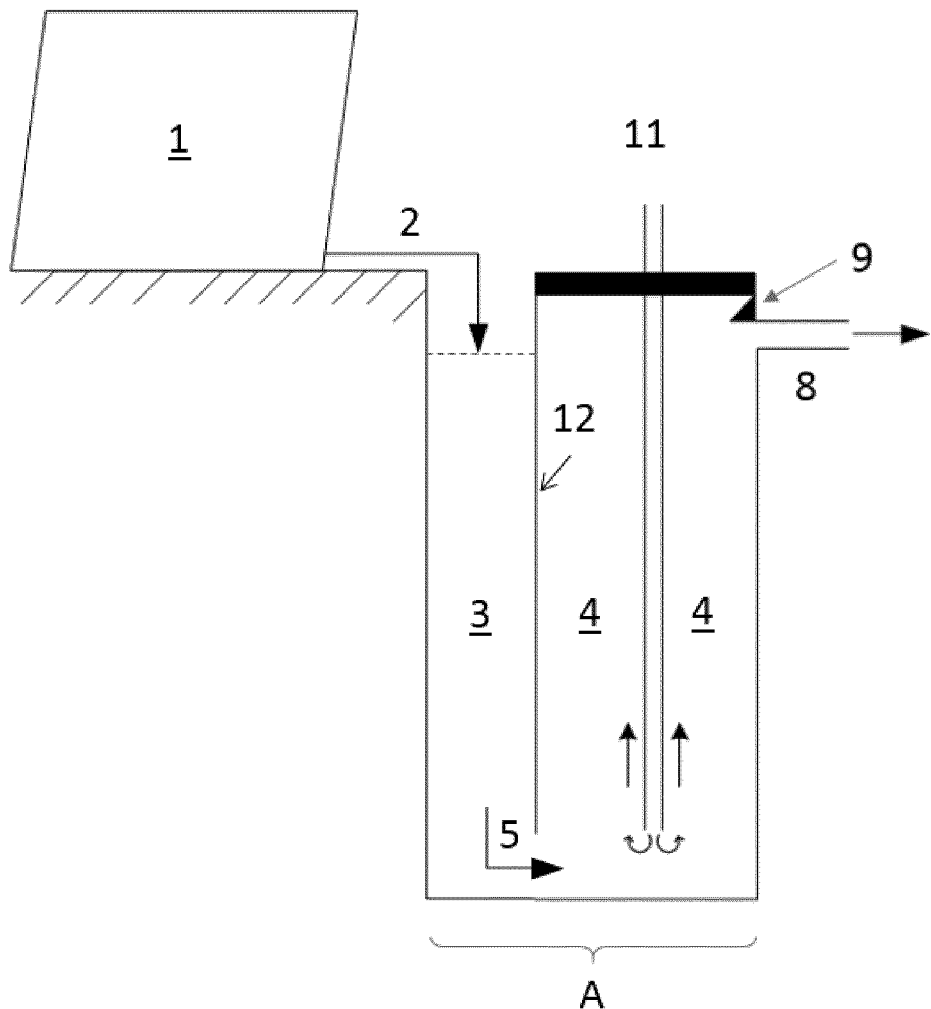
FIG. 3—schematic representation of another embodiment of the device according to the invention consisting of one desulphurisation reactor.

FIG. 3 shows a more compact version of the device A of FIG. 2. The passage 5 is now an opening in the common wall separating the entry section from the reaction section.

FIG. 4 shows the same device A as FIG. 2 with a return passage between the reaction section 4 and the entry section 3.

FIG. 5 shows the same device A as FIG. 3 with a return passage between the reaction section 4 and the entry section 3.

Figure 6:
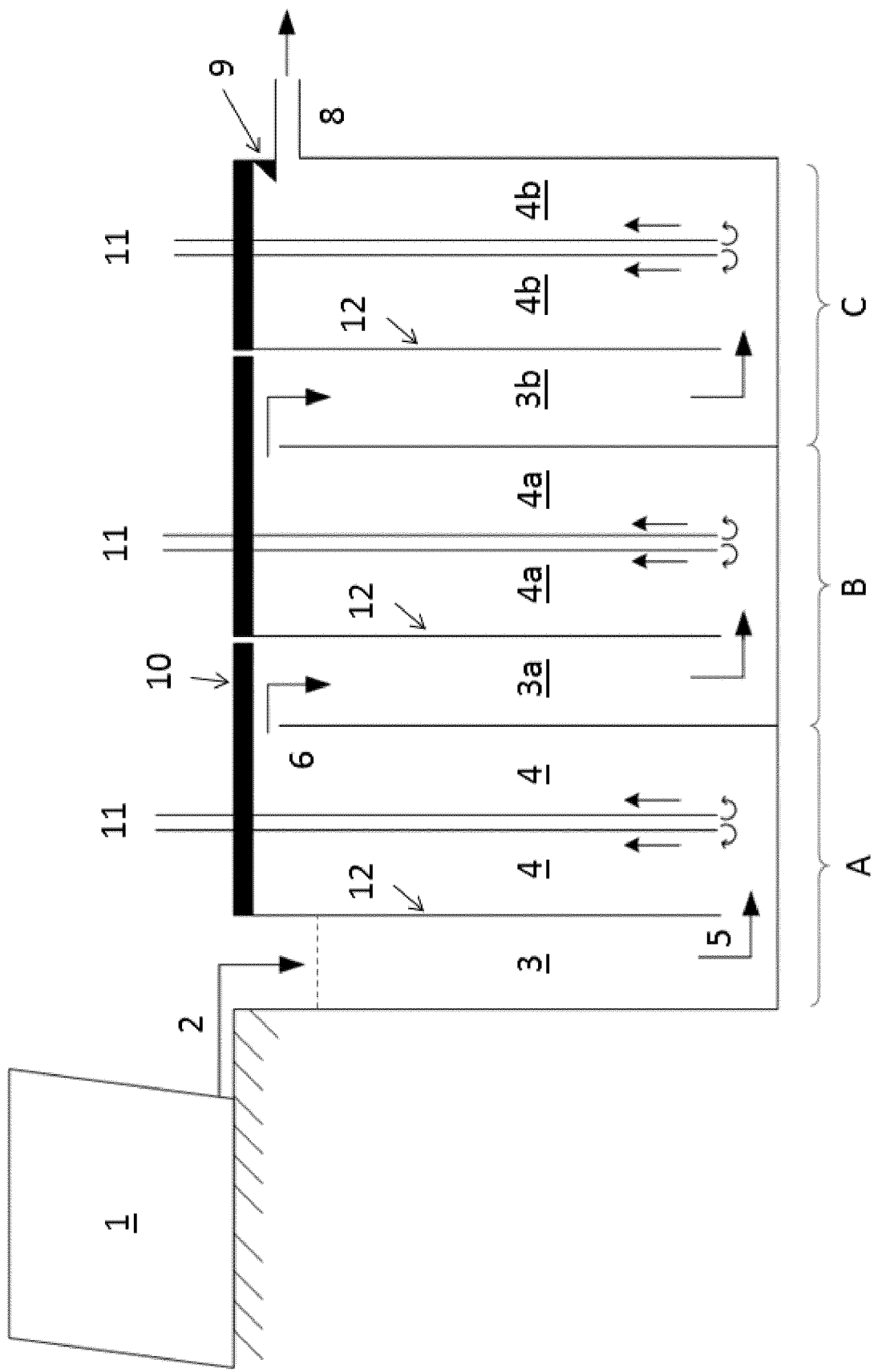
FIG. 6—schematic representation of another embodiment of the device according to the invention consisting of three desulphurisation reactors A, B and C connected in series.
Figure 7:
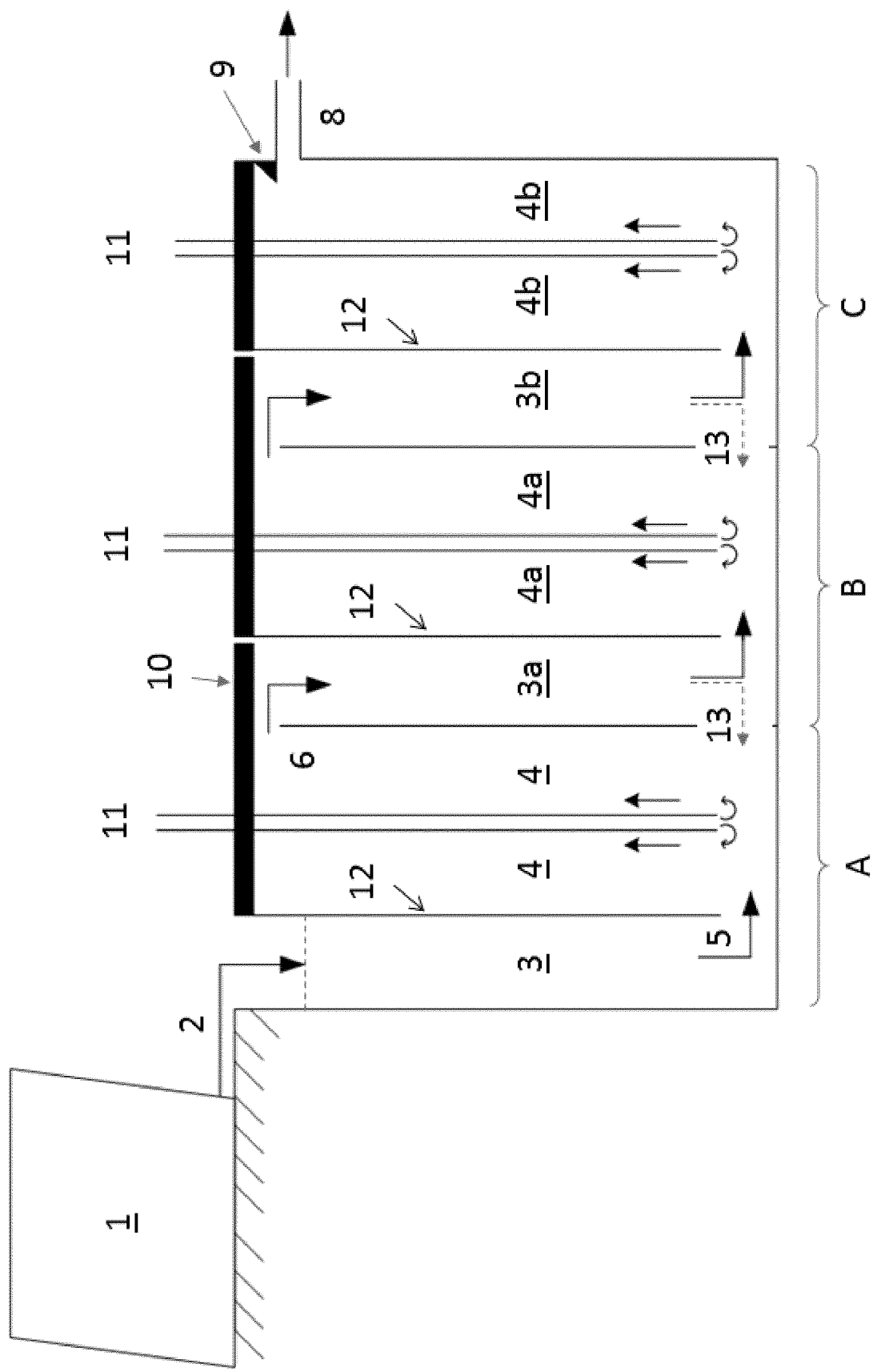
FIG. 7—as FIG. 6 with return passages 13 in separation wall(s) 12.
Figure 8:
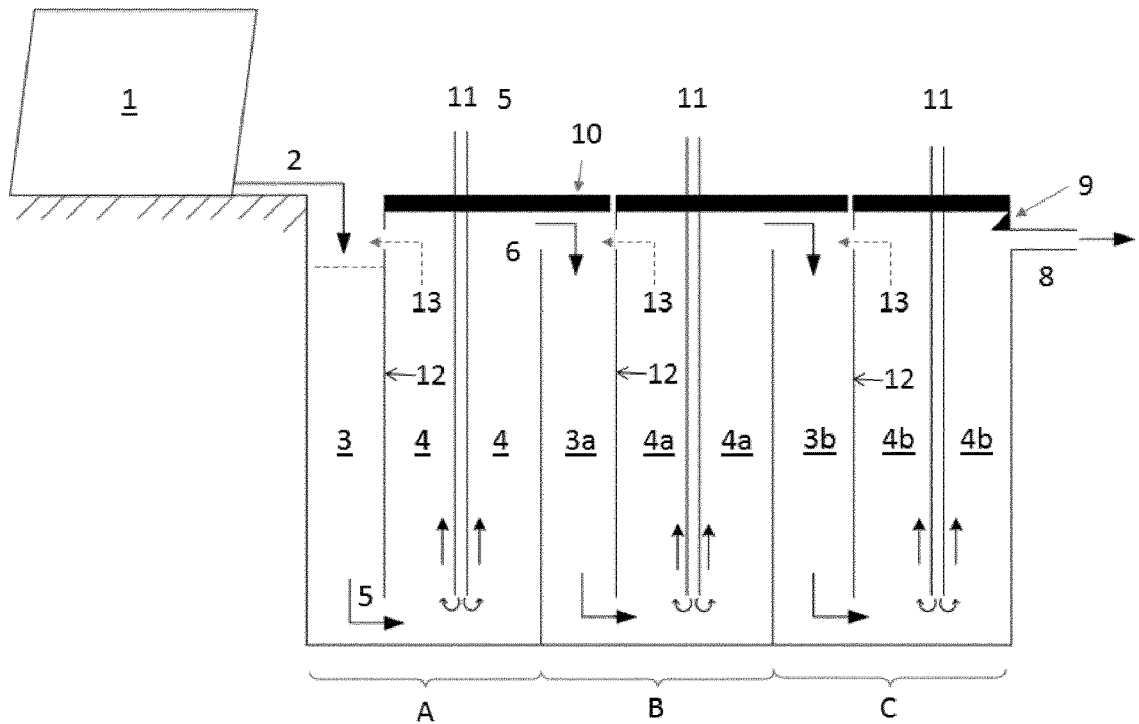
FIG. 8—as FIG. 6 with return passages 13.

FIG. 6 shows a device comprising a plurality (i.e. 3) devices as depicted schematically in FIG. 3. This allows the desulphurisation to be performed in steps. In the figure the liquid iron is desulphurised in the reaction section of the first desulphurisation reactor A including the reaction section 4 and the entry section 3, and is led to the entry section of the second reactor B including the reaction section 4a and the entry section 3a, and the process of reactor A is repeated, and again in third reactor C including the reaction section 4b and the entry section 3b. The individual reactors A, B and C are indicated with the brackets. FIGS. 7 and 8 also have a first desulphurisation reactor A including a reaction section 4 and an entry section 3, a second reactor B including a reaction section 4a and an entry section 3a, and a third reactor C including a reaction section 4b and an entry section 3b.

FIG. 7 shows a device comprising a plurality (i.c. 3) devices as depicted schematically in FIG. 3. The difference between this device and the one in FIG. 6 is the presence of a return passage 13 in the separation wall 12 which allows (part of) the liquid iron in the entry section of the second reactor B to flow back to the reaction section of reactor A. This increases the residence time of (part of) the liquid iron in the reaction section of reactor A. Preferably the return passage 13 is provided with opening-and-closing means to regulate the return flow of liquid iron. In FIG. 7 a return passage is also provided between reactor B and C. The individual reactors A, B and C are indicated with the brackets.

FIG. 8 follows the same principle as in FIG. 7, but here the return passages 13 are present in the individual reactors in the separation wall 12 between the entry section from the reaction section in a reactor and not, as in FIG. 7, in the wall separating two subsequent reactors. The individual reactors A, B and C are indicated with the brackets.

Figure 9:
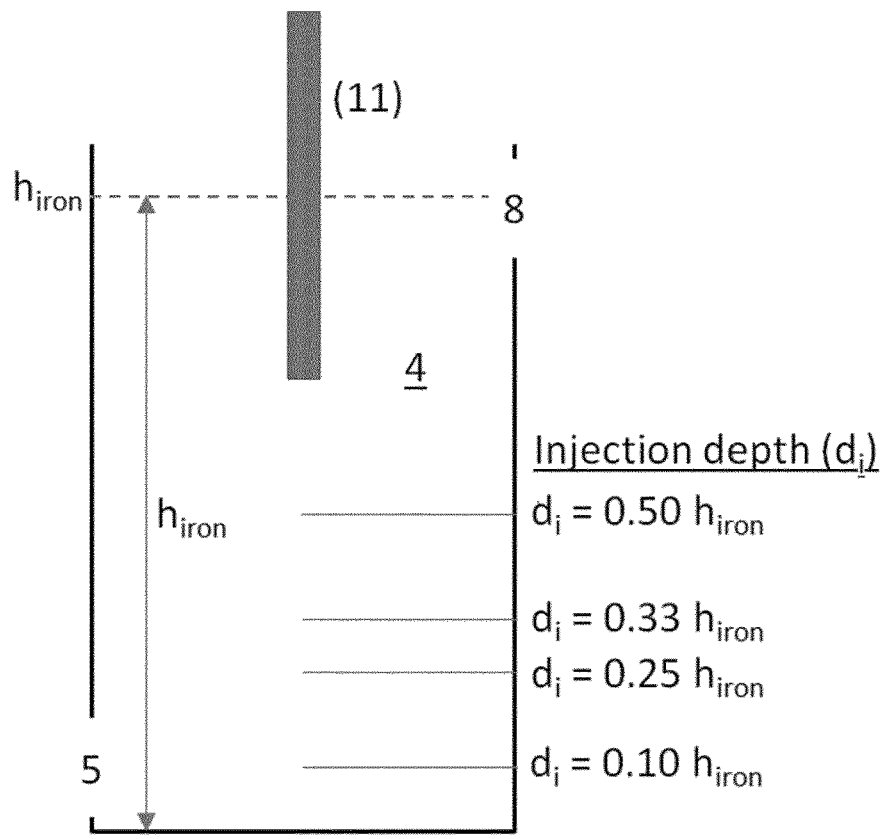
FIG. 9—definitions of injection depth and liquid iron level.

FIG. 9 intends to define the feature of injection depth in case a submerged lance is used to introduce the reagents into the liquid iron.

Figure 10:
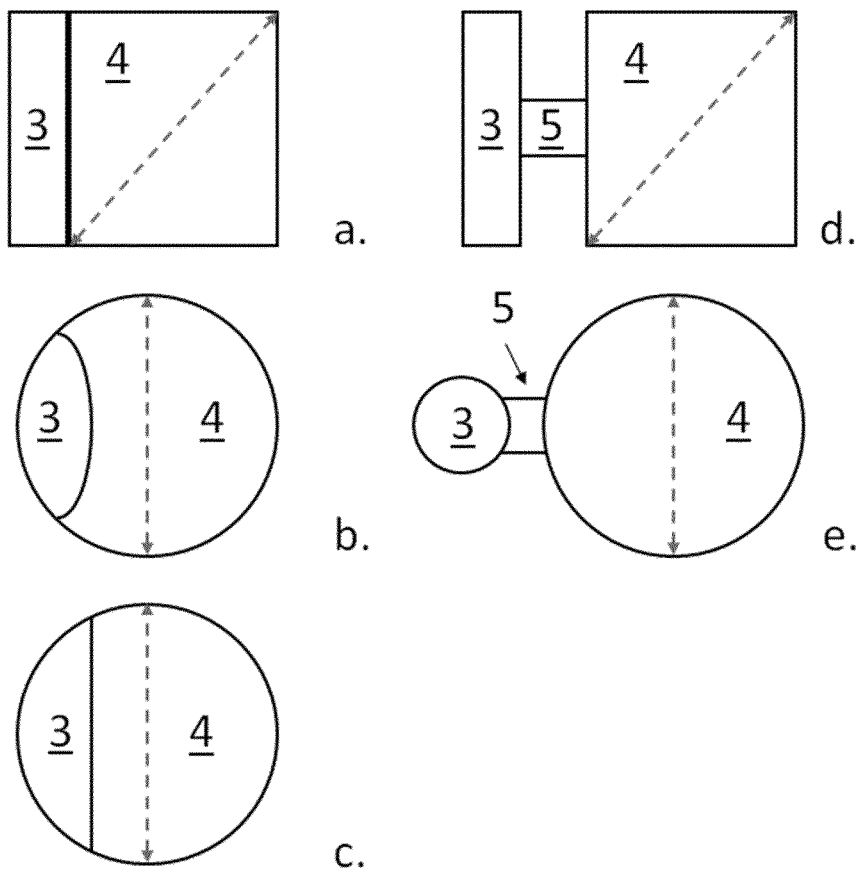
FIG. 10—schematic representation of cross sections of one desulphurisation reactor.

FIG. 10 depicts schematic shapes of the reactor as seen from above, and intends to explain the feature of the "largest diameter or diagonal of the cross-section of the respective reaction section" as used herein above in the aspect ratio. Many other shapes are conceivable in which case the largest diameter or diagonal is determined in a similar way as in FIG. 10.

Figure 11:
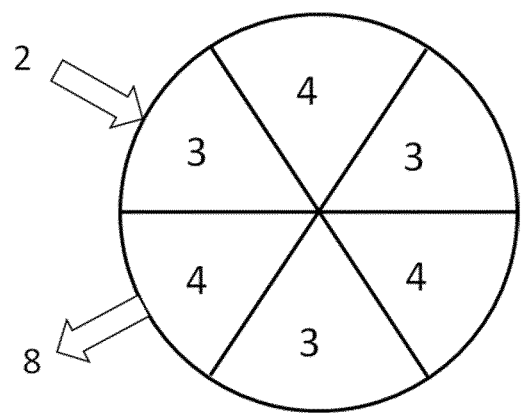
FIG. 11—schematic representation of a movable unit such as a ladle comprising a plurality of entry and reaction sections.

FIG. 11 shows an alternative layout of FIG. 6, 7 or 8 as seen from above with consecutive entry sections and reaction sections effectively comprising 3 separate desulphurisation reactors. The liquid enters the device in reaction section 3 through entry 2 and moves in a clockwise direction continuously to the outlet 8.

Figure 12:
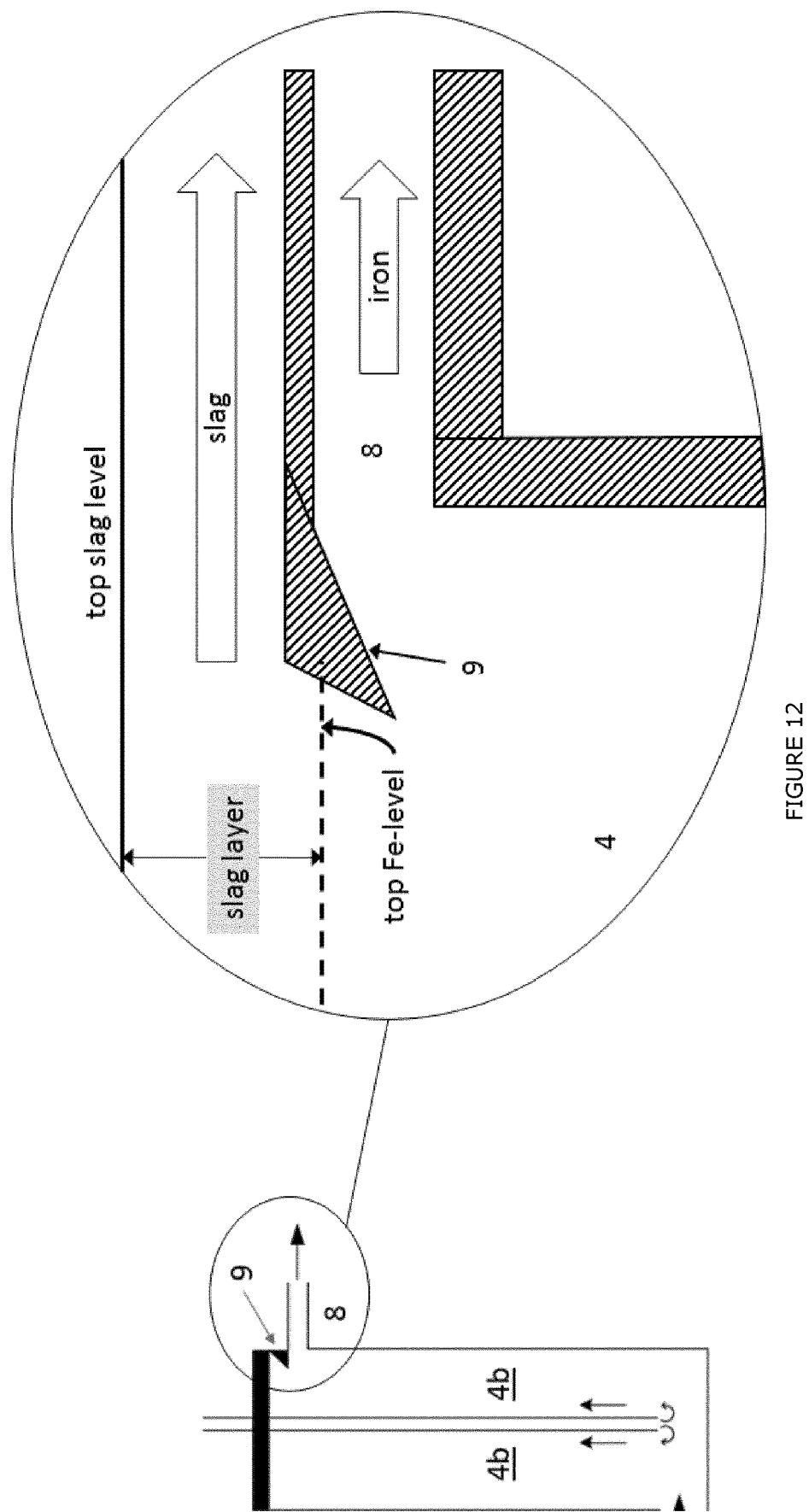
FIG. 12—schematic representation of slag removal means.

FIG. 12 shows one example of slag removal means 9 which assists in separating the slag that contains the sulphur that was removed from the liquid iron, from the desulphurised liquid iron by skimming off the slag that floats on top of the liquid iron.

Figure 13:
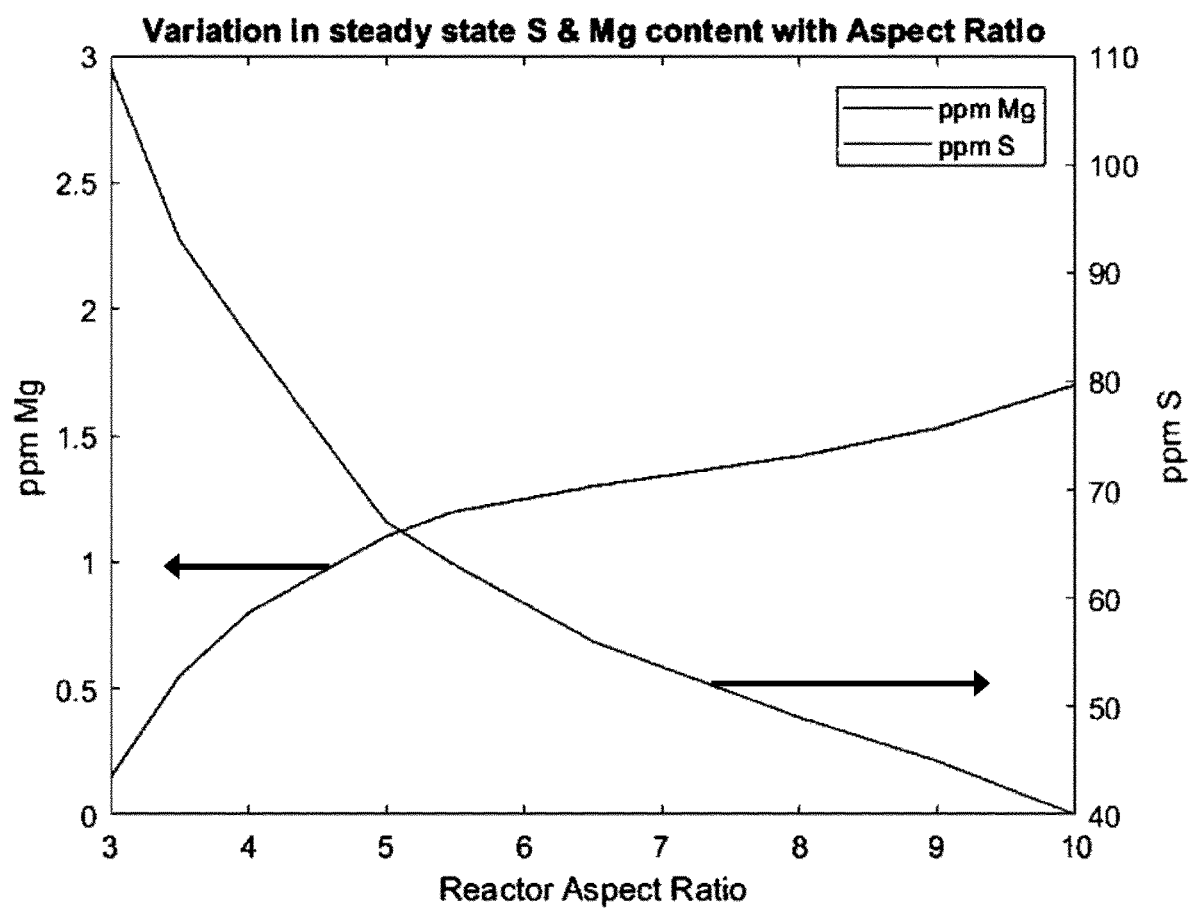
FIG. 13—Steady state sulphur content vs reactor aspect ratio for 100 m³ reactor.

FIG. 13 shows the effect of an increased aspect ratio on the sulphur content for a reactor of a certain size (100 m$^3$).

The invention claimed is:

1. A method of continuous desulphurisation of liquid iron in a device comprising one desulphurisation reactor or a plurality of consecutive desulphurisation reactors,
    wherein liquid iron produced by liquid iron production means enters an entry section of a desulphurisation reactor and subsequently flows to a reaction section of the desulphurisation reactor through a passage between the entry section and the reaction section,
    wherein the entry section and the reaction section act as communicating vessels, and wherein reagents are introduced into the liquid iron in the reaction vessel by means for introducing reagents into the liquid iron wherein the means for introducing reagents into the liquid iron comprise a submerged lance,
    vaporising, dissociating or reacting at least part of the reagents to form bubbles after introduction into the liquid iron, wherein the bubbles reduce the specific weight of the liquid iron in the reaction section, while simultaneously desulphurising the liquid iron by reacting with the sulphur in the liquid iron, and
    wherein, because of the difference in specific weight of the liquid iron entering the entry section and the specific weight of the liquid iron in the reaction section, the liquid iron causes an overall flow of the liquid iron from the entry section to the reaction section and subsequently to and through an outlet of the reaction section, and wherein
    (i) a return passage is provided between the reaction section of a desulphurisation reactor and the entry section of that desulphurisation reactor, and/or
    (ii) wherein the device comprises the plurality of consecutive desulphurisation reactors and the plurality of consecutive desulphurisation reactors comprises a first desulphurisation reactor and a second desulphurisation reactor, wherein a return passage is provided between the first desulphurisation reactor and the second desulphurisation reactor, wherein the return passage connects the entry section of the second desulphurisation reactor to the reaction section of the first desulphurisation reactor,
    to increase the residence time of the liquid iron in the device.

2. The method according to claim 1, wherein slag removal means are provided for a slag that, in use, is floating on top of the liquid iron, from the liquid desulphurised iron.

3. The method according to claim 2, wherein the device comprises the plurality of consecutive desulphurisation reactors and the plurality of consecutive desulphurisation reactors comprises the first desulphurisation reactor and the second desulphurisation reactor, and wherein an outlet of the first desulphurisation reactor is connected to an inlet of the second desulphurisation reactor to allow the already desulphurised liquid iron to pass from the reaction section of the first desulphurisation reactor to the entry section of the second desulphurisation reactor.

4. The method according to claim 1, wherein the reagents are injected through the submerged lance into the liquid iron in the reaction vessel.

5. The method according to claim 4, wherein the return passage or passages is or are provided with opening-and-closing means for adjusting, in use, the return flow of desulphurised liquid iron from the entry section of the second desulphurisation reactor to the reaction section of the first desulphurisation reactor.

6. The method according to claim 4, wherein the liquid iron production means comprise a direct reduction ironmaking process.

7. The method according to claim 4, wherein a slag flotation section is provided at least behind the last desulphurisation reactor, to allow, in use, separating a slag and any inclusions in the slag to float to the surface of the liquid iron and remove the slag from the liquid iron.

8. The method according to claim 4, wherein the reagents are injected at an injection depth (da) that is below 0.50 times the liquid iron level ($h_{iron}$).

9. The method according to claim 1, wherein the entry section and the reaction section are separated from each other by a separation wall, wherein the passage consists of an opening in the separation wall.

10. The method according to claim 1, wherein the return passage or passages is or are provided with opening-and-closing means for adjusting, in use, the return flow of desulphurised liquid iron from the entry section of the second desulphurisation reactor to the reaction section of the first desulphurisation reactor.

11. The method according to claim 1, wherein the entry section of the second desulphurisation reactor and the reaction section of the first desulphurisation reactor are separated by a separation wall, wherein the return passage consists of an opening in the separation wall.

12. The method according to claim 1, wherein the liquid iron production means comprise a direct reduction ironmaking process.

13. The method according to claim 1, wherein a slag flotation section is provided behind the one or more desulphurisation reactors, to allow, in use, a slag and any inclusions in the slag to float to the surface of the liquid iron and remove the slag from the liquid iron.

14. The method according to claim 1, wherein aspect ratio of height of the reaction section/largest diameter or diagonal of the cross-section of the respective reaction section is at least 3.

15. The method according to claim 1, wherein the device comprises the plurality of consecutive desulphurisation reactors and the plurality of consecutive desulphurisation reactors comprises the first desulphurisation reactor and the second desulphurisation reactor, wherein the plurality of subsequent desulphurisation reactors are connected in series, wherein an outlet of the first desulphurisation reactor is connected to an inlet of the second desulphurisation reactor to allow the desulphurised liquid iron to pass from the reaction section of the first desulphurisation reactor to the entry section of the second desulphurisation reactor for continued desulphurisation of the liquid iron.

16. The method according to claim 1, wherein the reagents are below 0.33 times the liquid iron level ($h_{iron}$).

17. The method according to claim 1, wherein the return passage is provided with opening-and-closing means to enable adjusting the return flow.

18. The method according to claim 1, wherein liquid iron is continuously provided to the device, and wherein the liquid iron is continuously desulphurised in the device, and wherein desulphurised liquid iron continuously exits the device.

19. The method according to claim 1, wherein the reagent introduced into the liquid iron by means of the submerged lance comprises magnesium.

20. The method according to claim 1, wherein at least one slag forming compound selected from the group consisting of $SiO_2$, $Al_2O_3$, $N_2O$, $K_2O$, $CaF_2$, $KAlF_4$, $Na_3AlF_6$, $CaCl_2$), MnO and $TiO_2$ is added to the liquid iron together with the reagents or added separately, to produce a liquid slag that floats on the liquid iron.

21. The method according to claim 1, wherein the outlet is provided at or near the top of the reaction section, to allow desulphurised liquid iron to exit the reaction section.

\* \* \* \* \*